July 3, 1956
R. H. WOLFF ET AL
2,752,856
TURBINE PUMP ASSEMBLY
Filed Feb. 1, 1951
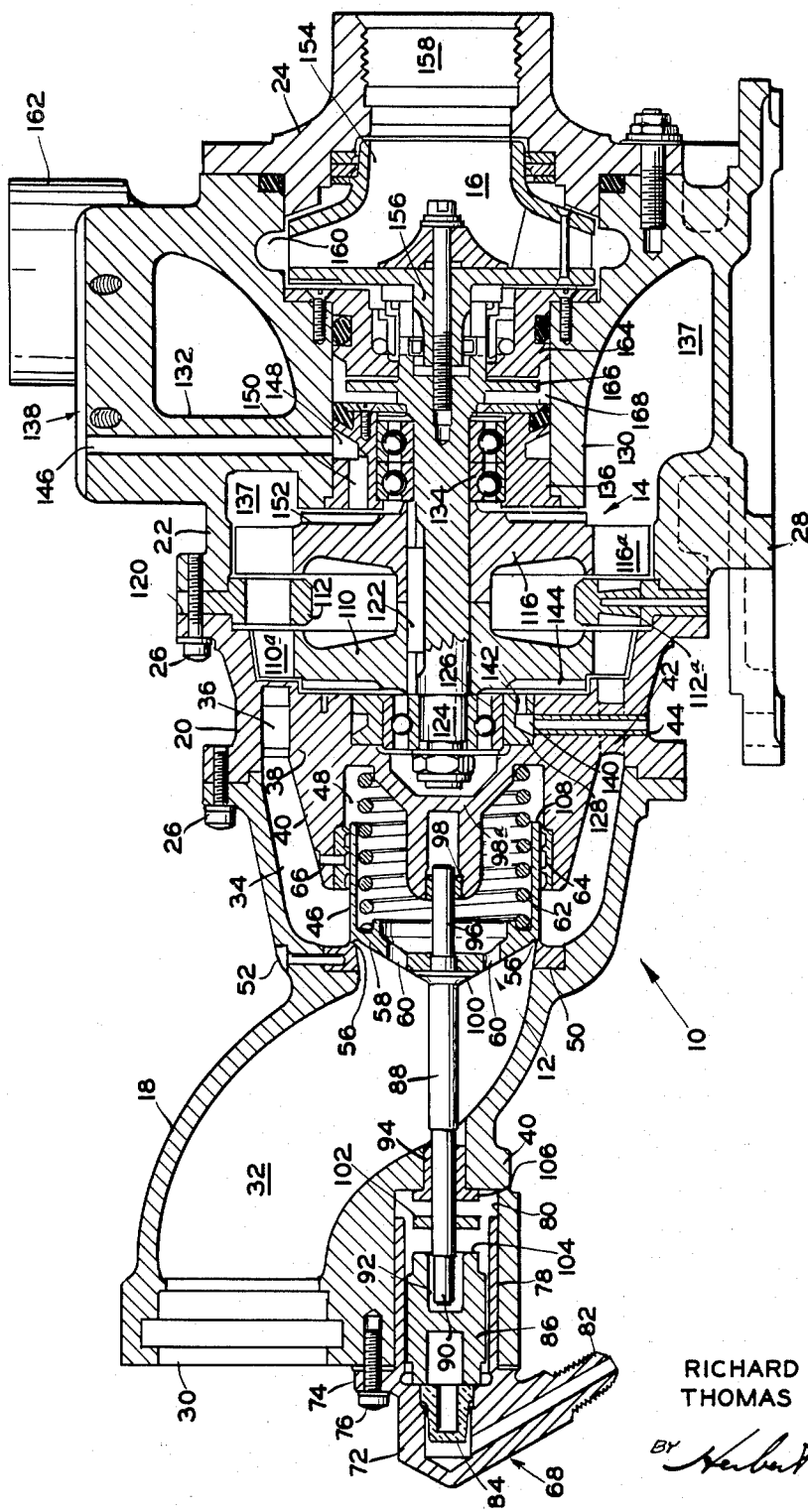
INVENTORS
RICHARD H. WOLFF
THOMAS W. JOHNSON
BY *Herbert L. Davis Jr.*
- ATTORNEY -

United States Patent Office 2,752,856
Patented July 3, 1956

2,752,856

TURBINE PUMP ASSEMBLY

Richard H. Wolff, Maywood, and Thomas W. Johnson, Parsippany, N. J., assignors to Bendix Aviation Corporation, Teterboro, N. J., a corporation of Delaware Application February 1, 1951, Serial No. 208,882

10 Claims. (Cl. 103—87)

This invention relates generally to pumping means and more specifically has to do with a compact turbine, fuel pump and control valve assembly for utilization with aircraft jet engines to afford means of delivering fuel to the engine or to the afterburner assembly thereof.

The space within an aircraft, or any component thereof, that is available for the storage or installation of accessories is usually very limited. It is apparent, therefore, that aircraft accessories should be designed and constructed so as to be compact in form to the end that they will occupy a minimum of space when installed within the aircraft.

Moreover, while all aircraft accessories must be capable of prompt and positive response to the actuation thereof, these features are particularly important in fuel pumps in order that there be an absolute minimum of time between the actuation thereof by the pilot, or other operator, and the response of the fuel pump.

The instant invention, therefore, contemplates a novel, compact fuel pump assembly, designed and constructed to occupy a minimum of space, and to that end, proposes to mount in axial alignment within a unitary housing or structure, a fuel pump, a turbine unit for driving the pump and valve means for controlling the delivery of an operating fluid to the turbine unit.

Another object of the instant invention is to provide a novel means of mounting the turbine unit within the housing including novel means for cooling the bearings supporting the turbine unit and fuel pump.

A further object contemplated herein is the provision of a novel compact sleeve valve for controlling the delivery of an operating fluid to a turbine unit.

A further object of the present invention is to provide a balanced sleeve valve designed and constructed for prompt and positive response to a relatively low actuating force, and embodying means whereby the pressure of the operating fluid controlled by the valve is utilized in the operation thereof.

The present invention also contemplates novel means for mounting, balancing and actuating a sleeve valve.

The foregoing and other objects and advantages will appear more fully hereinafter from a consideration of the detailed description which follows taken together with the accompanying drawings wherein one embodiment of the instant invention is illustrated by way of example. It is to be expressly understood, however, that the drawings are for purposes of illustration only and are not to be construed as defining the limits of the invention.

The drawing is a longitudinal section through the turbine driven pump forming the subject matter of the instant invention.

Referring now to the drawing, the novel turbine driven fuel pump assembly contemplated herein comprises, in general, a unitary structure or housing 10 in which is mounted, in axial alignment therein, a valve assembly 12, a two-stage turbine unit 14 of the impulse type and a pump assembly 16.

As shown in the drawing, the housing 10 is formed of an end section 18, intermediate sections 20 and 22 and an end section 24 that are joined together by bolts 26, or other suitable fastening means, to form the unitary housing structure 10. A base plate 28, integrally formed with the intermediate section 22, affords means whereby the pump assembly may be mounted, or secured, to a supporting structure such as the frame of an aircraft or jet engine.

The end section 18 is provided at one end thereof with an inlet 30 adapted to be connected to a source of high-energy operating fluid such as the discharge from the compressor of the jet engine. A conduit 32 leads from the inlet 30 to the valve assembly 12. In order to provide an annular conduit 34 and nozzles 36 whereby operating fluid from the conduit 32 is delivered to the turbine unit 14 and further to afford means whereby the valve assembly 12 may be mounted in a manner to control communication between the conduits 32 and 34, a nozzle block 38 having a frusto-conical extension 40, and radially disposed blades 42 formed integrally therewith, is centrally positioned within the housing 10 by hollow pins 44 which pass through the wall of the end section 20, the blades 42 and the nozzle block 38. The extension 40 of the nozzle block 38 extends into the end section 18 and cooperates therewith to form an annular conduit 34, while the blades 42 are so disposed relative to each other and around the periphery of the block 38 so as to form nozzles 36 that direct the operating fluid from the annular conduit 34 to the turbine unit 14.

The valve assembly 12 which controls communication between conduits 32 and 34, comprises a cylindrical member or sleeve 46 that is slidably received within a recess 48 formed in the extension 40 and which is adapted to sealingly engage an annular valve seat 50 fixedly secured by pins 52 in the end section 18 at the termini of the conduit 32. The outer end of sleeve 46 and valve seat 50 are provided with flat surfaces that cooperate at 56 to afford a substantially leakproof engagement between the sleeve 46 and its coacting seat 50.

Adjacent the outer end, thereof, the cylinder or sleeve is provided with a head or end plate 58 having a plurality of openings 60 formed therein whereby the operating fluid may enter the interior of the sleeve 46 for purposes to be hereinafter more fully set forth. A compression spring 62 operating between the head 58 and the end wall of the recess 48 biases the sleeve 46 in a direction to engage at 56 the flat surface of the sleeve 46 with the flat surface of the valve seat 50.

A labyrinth seal 64 mounted by a pin 66 in a recess formed at the open end of the recess 48 engages the outer surface of the sleeve 46 to the end that the sleeve 46 is guided thereby during its reciprocation and at the same time any substantial leakage of the operating fluid from the interior of the sleeve 46 to the conduit 34 is prevented.

To move the sleeve 46 into the recess 48 and thereby establish communication between the conduits 32 and 34, there is provided an actuator assembly generally designated by the reference character 68 which is mounted in a boss 70 formed on the end of the end section 18 adjacent the outlet 30 thereof. The actuator assembly comprises a housing 72 having a flange 74 whereby the assembly is mounted by bolts 76 to the end section 18 and a cylindrical section 78 adapted to be received into a recess 80 formed in the boss 70. An inlet 82 is afforded whereby fluid under pressure enters the housing 72 and passes through a filter element 84 formed of a suitable material to act upon a piston 86 slidably mounted in the cylindrical section 78. A valve stem or rod 88 having one end 90 thereof loosely received within a recess 92 formed in the piston 86, is mounted for reciprocation in a bearing 94 carried by the boss 70. The end 90 is loosely received in the recess 92 to prevent binding in the event of misalignment of the piston 86 and rod 88. The opposed end 96 of the rod 88 reciprocates in a bearing 98 carried by a boss 98a formed integrally with the block 38 and centrally disposed within the recess 48.

A shoulder or flange 100 formed on the rod 88 and adapted to engage the end plate 58, operatively connects the actuator assembly 68 to the sleeve 46. A spacer or shim 102 slidably mounted on the rod 88 within the cylinder 78 cooperates with the end 104 of the piston 86 and a flange 106 on the bearing 94 to limit the stroke of the piston 86 within the cylinder 78 to thereby limit the movement of the valve sleeve 46 into the recess 48. Thus, by selecting a shim or spacer 102 of the proper thickness, the travel of sleeve 46 and hence the opening between conduits 32 and 34 may be varied to any selected size.

As hereinbefore set forth, the sleeve 46 and valve seat 50 are provided with coacting flat surfaces at 56 respectively, and the head 58 is provided with openings 60 whereby the operating fluid enters the interior of the sleeve 46. Thus, means are afforded whereby the pressure of the operating fluid assists the spring 62 in maintaining the flat surfaces at 56 in engagement to the end that a relatively light spring 62 serves to establish a leakproof sealing engagement between the sleeve 46 and seat 50. The operating fluid pressure also assists in affording a quick or rapid opening of the valve assembly 12 upon the actuation of the actuator assembly 68 and initial opening of the valve sleeve 46 by acting on the flat surface of the valve sleeve 46. Moreover, by permitting the operating fluid to enter the interior of the sleeve 46 the pressure of the operating fluid acting on the interior surface thereof and opposite flat end 108 of the valve sleeve 46 serves to balance the sleeve 46 and to hold the valve sleeve 46 in the closed position until the initial opening thereof with the result that the valve assembly 12 operates smoothly and quickly with substantially no possibility of jamming or malfunctioning.

To achieve the foregoing results, the flat surface of the sleeve 46 at 56 is dimensioned to be of slightly less area than the end surface 108 of the sleeve 46. The opposed surfaces of the head or end plate 58 and sleeve 46 are dimensioned to be of equal area to the end that the pressure of the operating fluid acting thereon cancels out. When the valve assembly 12 is in closed position and the surface at 56 of the sleeve 46 is engaged with the surface of the valve seat 50, the pressure of the operating fluid is not effective upon the area of the sleeve 46 at the flat surface 56 but such pressure is effective on the end surface 108 of the sleeve 46. Therefore, a net force acting in a direction to engage the sleeve 46 with the valve seat 50 is produced which assists the spring 62 in maintaining the valve assembly 12 in a closed position. However, upon the actuation of the assembly 68, the sleeve 46 moves away from the valve seat 50 to the end that the pressure of the operating fluid now becomes effective on the area of the surface of the valve sleeve at 56. The force developed by the end surface 108 is thereby substantially balanced and a smooth, quick operation of the valve assembly 12 is accomplished.

The turbine unit 14 is of the two stage impulse type, and turbine wheel 110 has provided spaced, fixed buckets 110a, a stator 112 having spaced, fixed vanes 112a, and a second stage turbine wheel 116 having spaced, fixed buckets 116a. The stator 112 is provided with a peripheral flange 120 adapted to receive the bolts 26 to thereby mount the stator 112 between the intermediate sections 20 and 22 and operatively position the vanes 112a thereof between the buckets 110a and 116a of the turbine wheels 110 and 116 respectively. The turbine wheels 110 and 116 are fixedly mounted by a common key 122 to a shaft 124 for rotation therewith.

The shaft 124 is rotatably supported at one end thereof in an anti-friction bearing 126 that is carried in a bearing retainer 128 fixedly mounted in a recess formed in the nozzle block 38. To rotatably support the shaft 124 intermediate of its ends, an element 130, integrally formed with the intermediate section 22, and supported in a centrally disposed position therein by radial arms 132, is provided with a recess in which is mounted a bearing retainer 134 and bearing 136.

The centrally disposed element 130 also defines within the intermediate section 22 an annular discharge conduit 137 that receives the operating fluid from the second stage turbine 116 and discharges it through an exhaust opening 138 formed in the intermediate section 22.

As hereinbefore set forth, the nozzle block 38 is held in position by hollow pins 44 that pass through the wall of the intermediate section 20, the blades 42 and the nozzle block 38. The pins 44 are designed to terminate at the recess formed in the nozzle block 38 in which is supported the bearing retainer 126.

Means whereby a flow of cooling air may be drawn through the retainer 126 is disclosed and claimed broadly in the copending application Serial No. 144,665, now abandoned, filed February 17, 1950, by Thomas W. Johnson and assigned to Bendix Aviation Corporation.

In the present application, however, there is disclosed an improved cooling means in which the bearing retainer 126 is provided with a peripheral groove 140 that communicates with the hollow pins 44 which serve the double purpose of holding the blades 42 in position and providing a passage for the cooling air. A plurality of longitudinal bores 142 formed in the bearing retainer 126 each communicate at one end thereof with the groove 140 while the opposed end thereof opens toward the turbine 110. A fan 144 formed on the side of the turbine 110 and facing the bores 142 serves to draw air, when the turbine is rotating, through the hollow pins 44, groove 140 and bores 142 to cool the bearing retainer 126. The air thus drawn through the bearing retainer 126 exhausts into stream of operating fluid just after it leaves the nozzles 36. Thus, due to the relatively high velocity of the operating fluid at this point a low pressure area is present that assists in drawing the air through the flow-path hereinbefore described.

Similar cooling means for the bearing retainer 134 are also provided. In this instance, the support arms or posts 132, are provided with passages 146 that open, at one end thereof to the atmosphere and at the opposite end thereof communicate with a peripheral groove 148 formed in the bearing retainer 134. Longitudinal bores 150 in the retainer 134 and a fan 152 on the face of the turbine 116 serve to establish a flow path of cooling air from the atmosphere through the passages 146, groove 148, and bores 150 to the exhausting stream of the operating fluid in the conduit 137.

The pumping unit 16 may be of a type such as described and claimed in copending application Serial No. 128,813 filed on November 22, 1949, now Patent No. 2,641,190, in the name of Thomas W. Johnson and assigned to Bendix Aviation Corporation, is housed within the intermediate section 22 and the end section 24. The pumping unit 16 comprises an impeller 154 that is operatively connected through a suitable coupling 156 to the shaft 124 to the end that the rotation of the shaft 124 by the turbine unit 14 serves to rotate the impeller 154 of the pumping unit 16. The end section 24 is provided with an inlet 158 adapted for detachable connection to a fuel supply and upon the rotation of the impeller 154, fuel is drawn into the pumping unit 16 where it is discharged by the impeller 154 into and through volute chamber 160 to the fuel outlet 162 formed in the intermediate section 22 and arranged for detachable connection to a conduit leading to the fuel nozzles of an engine which may be of the jet type. Suitable sealing means, generally designated by the reference character 164, are interposed between the bearings 136 and the impeller 154. The sealing means 164 also include a slinger seal 166 which discharges into a passage 168 and through a suitable conduit, not shown, formed in the intermediate housing 22 to drain.

Having thus described the design and construction of the novel pumping means contemplated herein, it will be apparent to one skilled in the art, that when the inlet 30 is connected to a source of high energy operating fluid such as would be obtainable from the compressor of a jet engine, the operating fluid will pass through the inlet 30 and conduit 32 to the valve assembly 12. The valve assembly 12 will operate in the novel manner hereinbefore set forth to close communication between the conduits 32 and 34 and the turbine unit 14 and pumping unit 16 will remain stationary.

Upon the actuation by the pilot or other operator of a suitable device to force an actuating fluid into the inlet 82 of the actuator assembly 68, the piston 86 thereof will operate through the valve stem 88 to move the sleeve 46 into recess 48 thus establishing communication between the conduits 32 and 34. The operating fluid will then pass through conduit 34, and nozzles 36 to the turbine unit 14 whereupon the turbines 110 and 116 will operate to rotate shaft 124. The operating fluid discharging from the turbine 116 is led through annular conduit 137 to the exhaust opening 138.

As the turbine unit 14 rotates, the fan 144 of the turbine 108 will produce a flow path of cooling air from the atmosphere through the hollow pins 44, and grooves 140, bores 142 to cool the bearing retainer 126. A similar flow of cooling air for the bearing retainer 134 is induced from the atmosphere through the passages 146, groove 148 and bores 150 by the fan 152 of the turbine 116. The rotation of the shaft 124 also serves to rotate the impeller 154 of the pumping unit 16 and thereby produce flow of fuel from the inlet 158 through the impeller 154, volute 160 to the fuel outlet 162 of the intermediate section 22.

Upon the release of the actuating pressure in the assembly 68, the spring 62 moves the sleeve 46 into engagement with the valve seat 50 thereby closing communication between the conduits 32 and 34 and "cutting off" the delivery of the operating fluid to the turbine unit 14.

There is thus provided a novel turbine driven pumping means whereby the several objects of the instant invention have been accomplished.

Although only one embodiment of the instant invention has been illustrated and described, other changes and modifications in the form and relative arrangement of parts, which will be apparent to those skilled in the art, may be made without departing from the spirit and scope of the invention.

We claim:

1. A pumping assembly comprising the combination of a unitary housing, first inlet means at one end of said housing adapted to receive a high energy operating fluid from an outside source, a first support element having radially disposed blades integrally formed therewith whereby said first support element is centrally disposed in said housing, said blades being spaced relative to each other to define injector nozzles, an extension on said first support element forming with said housing a delivery conduit, said delivery conduit being in communication with said first inlet means, said extension having a central recess formed therein opening to said first inlet means, a sleeve mounted for reciprocation in the recess formed in said extension, an annular valve seat mounted in said first inlet means and including an annular flat surface facing said sleeve, said sleeve having an annular flat surface adapted to engage the flat surface of the valve seat, a head closing the end of said sleeve valve adjacent the flat surface thereof, a spring operative between the end wall of the recess formed in said extension and said head to bias said sleeve in a direction to engage the flat surface of said sleeve with the flat surface of said valve seat whereby said sleeve closes communication between said first inlet means and said delivery conduit, actuating means in axial alignment with said sleeve and embodying means for moving said sleeve into the recess formed in said extension to thereby establish communication between said inlet means and said delivery conduit, a second support element formed integral with said housing and centrally disposed therein in axial alignment with said first support element, said second support element forming with said housing a discharge conduit, said first support element having formed therein a central bearing recess opening toward said second support element, said second support element having formed therein a central bearing recess opening toward said first support element, bearing means mounted in the bearing recesses formed in said first and second support elements, a shaft rotatably supported in said bearing means, and turbine means fixedly secured to said shaft for rotation therewith, said turbine means being positioned within said housing so as to be responsive to the operating fluid delivered through said delivery conduit and injector nozzles to rotate said shaft and to pass said operating fluid to said discharge conduit.

2. In combination a unitary housing, inlet means at one end of said housing adapted to receive a high-energy fluid from an outside source and a side outlet for discharging fluid from said housing, a first support element having a plurality of radially disposed blades formed integral therewith whereby said first support element is centrally disposed and supported within said housing, a second support element having a plurality of radially disposed arms formed integral with said second support element and said housing whereby the former is centrally disposed and supported within the latter in spaced axial alignment with said first support element, said first and second support elements defining with said housing a conduit communicating said inlet to said outlet, a first retainer recess formed centrally in said first support element and opening toward said second support element, a second retainer recess formed in said second support element in axial alignment with and opening toward said first retainer recess, a first bearing retainer mounted in said first retainer recess, a second bearing retainer mounted in said second retainer recess, bearings in said first and second bearing retainers, a shaft rotatably mounted in said bearings, a first turbine wheel on said shaft adjacent said first support element, a second turbine wheel on said shaft adjacent said second support element, said first and second turbine wheels being secured by a common key to said shaft for rotation therewith, a fan formed on said first turbine wheel adjacent said first support element, a fan formed on said second turbine wheel adjacent said second support element, said first bearing retainer having formed therein a peripheral groove and a plurality of longitudinal bores opening at one end to said groove and at the other end to the fan on said first turbine wheel, said second bearing retainer having formed therein a peripheral groove and a plurality of longitudinal bores opening at one end to said peripheral groove and at the other end to the fan on said second turbine wheel, hollow fastening means passing through the wall of said housing and first support element for fixedly securing said first support element relative to said housing, the hollow fastening means defining a passage between the ambient atmosphere and the peripheral groove formed in said first bearing retainer, at least one of the support arms of said second support element having formed therein a passage between the ambient atmosphere and the peripheral groove formed in said second bearing retainer, said first and second turbine wheels having operating elements disposed in the conduit formed by said first and second support elements whereby a high-energy fluid passing through said conduit from said inlet to said outlet rotates said first and second turbine wheels, the fan on said first turbine wheel being operative upon the rotation thereof to draw a current of air through the passages defined by said hollow fastening means and said peripheral groove and longitudinal bores formed in said first bearing retainer to cool the bearing supported therein, and the fan on said second wheel being operative upon the rotation thereof to draw a current of air through the passage defined by the supporting arm of said second support element and the peripheral groove and longitudinal bores formed in said second bearing retainer to cool the bearing supported therein.

3. In a turbine driven pump including a housing, a support element centrally disposed in said housing, a bearing supported in a recess formed in said support element, and a turbine mounted on a shaft rotatably supported in said bearing, the combination of means for supporting the bearing in the support element and cooling the bearing upon the rotation of said turbine, comprising a bearing retainer adapted to be received in the recess formed in said support element and to embrace the bearing, a fan on said turbine adjacent said bearing retainer, said bearing retainer having a peripheral groove formed therein, and a plurality of longitudinal bores communicating with said peripheral groove and the interior of said housing adjacent the fan on said turbine, and said support element having passage means formed therein communicating the groove formed in said bearing retainer to atmosphere whereby the rotation of the fan on said turbine causes a cooling current of air to flow from the atmosphere through said passage means, peripheral groove and longitudinal bores.

4. The combination with a housing having inlet means at one end thereof for receiving a high-energy fluid from an outside source, outlet means in said housing for discharging said fluid therefrom, support elements centrally disposed within said housing and defining therewith a conduit communicating said inlet means with said outlet means, and a turbine unit rotatably supported in said support elements and operative in response to a flow of high-energy fluid through said conduit, of valve means carried by one of said support elements and constructed and arranged to control communication between said inlet means and said conduit comprising an annular valve seat carried by said inlet means and having a flat surface facing one of said support elements, said support element having a central recess formed therein, a cylindrical sleeve slidably and sealingly received within the recess formed in said support element, a flat surface formed on one end of said sleeve adapted to engage the flat surface of said valve seat, an end plate closing the end of said cylindrical sleeve adjacent the end thereof having said flat surface, said end plate having a plurality of openings formed therein whereby the interior of said valve means is placed in communication with the operating fluid in said inlet means, a spring biasing said sleeve in a direction to engage the flat surface thereof with the flat surface of said valve seat to thereby close communication between said inlet means and said conduit, and means for moving said sleeve into the recess formed in said support element against the bias of said spring whereby communication is established between said inlet means and said conduit.

5. In combination a housing having an inlet passage at one end of said housing for receiving a high-energy fluid from an outside source and having an outlet passage for discharging said high-energy fluid from the housing, support elements centrally disposed within said housing and defining therewith a conduit communicating said inlet passage with said outlet passage, turbine means rotatably supported in said support elements and operative in response to a flow of high-energy fluid through said conduit, an annular valve seat in said inlet passage adjacent said conduit, an annular flat surface formed on said valve seat, a sleeve valve mounted for reciprocation into and out of one of said support elements and having an annular flat surface adapted to engage the annular flat surface of said valve seat, a spring biasing said sleeve valve in a direction to engage the annular flat surface of said sleeve valve with the annular flat surface of said valve seat, and means for moving said sleeve valve into said support element to thereby establish communication between said inlet passage and said conduit.

6. In combination a housing, inlet means at one end of said housing for receiving a high-energy fluid from an outside source, outlet means in said housing for discharging said high-energy fluid therefrom, support elements centrally disposed within said housing and defining therewith a conduit connecting said inlet means to said outlet means, turbine means rotatably supported in said support elements and operative in response to a flow of high-energy fluid through said conduit, an annular valve seat in said inlet means adjacent said conduit and having an annular flat surface, one of said support elements having a central recess formed therein opening toward and adjacent to said inlet means, a cylindrical sleeve mounted for reciprocation into and out of said recess, said cylindrical sleeve having a flat surface formed on one end thereof for engagement with the flat surface of said valve seat, the flat surface formed on one end of said cylindrical sleeve being of lesser area than the opposed end of said cylindrical sleeve, a head closing one end of said sleeve adjacent the flat surface formed thereon, said head having a plurality of openings formed therein for placing the interior of said sleeve in communication with the high-energy fluid in said inlet means, a spring operative against said head for biasing said cylindrical sleeve in a direction to engage the flat surface formed on said sleeve with the flat surface formed on said valve seat, a fluid pressure responsive means mounted in said housing adjacent said inlet means and in axial alignment with said cylindrical sleeve, and a valve stem connecting said fluid pressure responsive means to said cylindrical sleeve whereby the actuation of the fluid pressure responsive means moves said cylindrical sleeve into the recess formed in said support element to thereby establish communication between said inlet means and said conduit.

7. In a pumping assembly the combination comprising a unitary housing, first inlet means at one end of said housing to receive a high energy fluid from an outside source, an outlet for exhausting the high energy fluid therefrom, first and second support elements centrally disposed and in axial alignment within said housing, and defining with said housing, conduit means between said inlet and outlet, valve means in said first support element controlling flow from said inlet to said conduit means, actuating means for said valve means, bearing means in said first and second support elements, passageway means through each of said bearing means and support elements and communicating with atmosphere, a shaft rotatably supported in said bearing means, turbine means fixedly secured to said shaft for rotation therewith, said turbine means disposed in said housing so as to be rotatable by the flow of high energy fluid through said conduit means, and fan means on said turbine means operable upon rotation to draw air through said passageway means to cool said bearing means.

8. In a pumping assembly of the character described, a unitary housing structure having a central turbine chamber, an inlet passage at one end adapted for detachable connection to the high pressure fluid discharge of a compressor unit of an aircraft engine, a valve chamber intermediately of the inlet passage and the turbine chamber, supporting elements disposed within the housing at opposite ends of the turbine chamber for rotatably supporting an elongated shaft axially of the turbine chamber, nozzle elements communicating the valve chamber with turbine chamber, supporting elements disposed in the valve chamber for supporting valve means controlling communication of high pressure fluid from the inlet passage through the nozzle elements to the turbine chamber, the turbine chamber being enlarged to accommodate a turbine wheel fixed at one end of the shaft and rotatably responsive to high pressure fluid entering the turbine chamber through the nozzle elements, an exhaust outlet in communication with the turbine chamber, a fuel inlet passage at the opposite end of the housing adapted for detachable connection in the fuel supply line of the aircraft engine, a fuel pump chamber intermediately of the turbine chamber and the fuel inlet passage, means sealing the fuel pump chamber off from the turbine chamber, the sealing means having an axial opening to accommodate an extension of the shaft from the turbine chamber into the fuel pump chamber, the fuel pump chamber being enlarged to accommodate a centrifugal fuel pump adapted to be connected to the extended end of the shaft for rotation therewith, and the housing structure further having a discharge passage communicating the fuel pump chamber with a fuel outlet adapted for connection with an aircraft engine.

9. In combination a housing, inlet means at one end of said housing for receiving a high-energy fluid from an outside source, outlet means in said housing for discharging said high-energy fluid therefrom, support elements centrally disposed in said housing and defining therewith a conduit connecting said inlet means to said outlet means, turbine means rotatably supported in said support elements and operative in response to a flow of high-energy fluid through said conduit, a valve seat between said inlet means and conduit, valve means including a sleeve cooperating with said valve seat, said sleeve having an inner end portion and an opposite outer end portion to contact said valve seat, said sleeve reciprocatingly mounted in one of said support elements to control communication between said inlet means and said conduit, spring means biasing the outer end portion of the sleeve into contacting relation with said valve seat and said sleeve to a position closing communication between said inlet means and conduit, said sleeve of the valve means being open interiorly to the high-energy fluid so that the high-energy fluid applies pressure to the inner end portion of said sleeve to supplement said spring in maintaining said outer end portion of the sleeve in contacting relation with said valve seat and said valve means in closed position, and an actuator assembly connected to said valve means to initially open said valve means against the biasing effect of said spring and high-energy fluid whereupon the high-energy fluid applies pressure to the outer end portion of the sleeve to supplement the opening of said valve means by said actuator assembly.

10. In a turbine driven pump including a housing, a support element disposed in said housing, bearing supported in a recess formed in said support element, and a turbine mounted on a shaft rotatably supported in said bearing, the combination of means for supporting the bearing in the support element and cooling the bearing upon the rotation of said turbine, comprising a bearing retainer positiond in the recess formed in said support element and embracing the bearing, said bearing retainer having a peripheral groove formed therein, means to supply a cooling fluid medium to said peripheral groove including first fluid passage means communicating with said peripheral groove and the interior of said housing, cooling fluid impeller means driven by said turbine, said first fluid passage means being open adjacent the fluid impeller means driven by said turbine, and said support element having second fluid passage means formed therein communicating with the peripheral groove formed in said bearing retainer, the first and second fluid passage means of said supply means cooperating to circulate a cooling fluid medium into and out of said peripheral groove upon rotation of the fluid impeller means by said turbine so as to cause a cooling current of fluid medium to flow through the first and second passage means and peripheral groove to radially cool the bearing within the retainer by a circumferential flow of cooling fluid medium in the peripheral groove and about the bearing.

References Cited in the file of this patent

UNITED STATES PATENTS

| | | |
|---|---|---|
| 811,663 | Reeves | Feb. 6, 1906 |
| 1,004,822 | Scheurmann | Oct. 3, 1911 |
| 1,329,515 | Egger | Feb. 3, 1920 |
| 1,674,490 | Viele | June 19, 1928 |
| 1,894,393 | Bigelow | Jan. 17, 1933 |
| 1,929,157 | Waller | Oct. 3, 1933 |
| 2,083,167 | Lamere | June 8, 1937 |
| 2,364,189 | Buchi | Dec. 5, 1944 |
| 2,401,826 | Halford | June 11, 1946 |
| 2,428,830 | Birmann | Oct. 14, 1947 |
| 2,484,275 | Eastman | Oct. 11, 1949 |
| 2,487,532 | Eastman | Nov. 8, 1949 |
| 2,516,822 | Yates | July 25, 1950 |
| 2,544,852 | Newton | Mar. 13, 1951 |
| 2,606,501 | Dreibelbis | Aug. 12, 1952 |

FOREIGN PATENTS

| | | |
|---|---|---|
| 9,716 | Great Britain | May 9, 1905 |
| 630,253 | Germany | May 23, 1936 |